United States Patent [19]
Sogawa

[11] Patent Number: 5,321,973
[45] Date of Patent: Jun. 21, 1994

[54] KNOCKING DETECTING SYSTEM AND METHOD FOR AN INTERNAL COMBUSTION ENGINE

[75] Inventor: Yoshiyuki Sogawa, Mitaka, Japan

[73] Assignee: Fuji Jukogyo Kabushiki Kaisha, Tokyo, Japan

[21] Appl. No.: 816,271

[22] Filed: Jan. 3, 1992

[30] Foreign Application Priority Data

Jan. 31, 1991 [JP] Japan .................... 3-32018

[51] Int. Cl.$^5$ ............................. G01L 23/22
[52] U.S. Cl. ............................ 73/35; 123/425
[58] Field of Search ............. 73/35 KS, 35 K, 35 R; 123/425, 435

[56] References Cited

U.S. PATENT DOCUMENTS

| | | | |
|---|---|---|---|
| 4,478,068 | 10/1984 | Bonitz et al. | 73/35 |
| 4,750,103 | 6/1988 | Abo et al. | 73/35 |
| 4,899,710 | 2/1990 | Takahashi | 123/435 |
| 5,083,278 | 1/1992 | Matsuura | 123/435 |

*Primary Examiner*—Hezron E. Williams
*Assistant Examiner*—Helen C. Kwok
*Attorney, Agent, or Firm*—Beveridge, DeGrandi, Weilacher & Young

[57] ABSTRACT

A knocking detecting system comprising a microcomputer with an A/D converter, 4 which receives a frequency signal processed in accordance with the vibration signal of a knock sensor 1. The microcomputer 4 with the A/D converter operates including, at least, the A/D-conversion steps $S_1$–$S_4$ of continuously sampling digital values, the steps $S_5$–$S_9$ of integrating the differences between the digital values and a background level over a detecting period, and the steps $S_{10}$–$S_{12}$ of comparing the integrated value with a judgement level, thereby to judge the presence of knocking and to evaluate a knocking level. The signal of the knock sensor 1 is converted into the digital values and is then arithmetically processed by the microcomputer 4. Thus, the knocking is detected, and the background level is calculated at high precision.

6 Claims, 4 Drawing Sheets

KNOCKING DETECTING SYSTEM AND METHOD FOR AN INTERNAL COMBUSTION ENGINE

BACKGROUND OF THE INVENTION

1. Field of the Invention

The present invention relates, to a knocking detecting system for detecting the presence of knocking an automobile engines on the basis of the signal of a combustion vibration from a knocking sensor. More particularly, it relates to a system and a method in which a knocking signal is A/D-converted by a microcomputer for the detection of knocking and the calculation of a background level.

2. Description of the Prior Art

For the control of the ignition timing or supercharging pressure in an automobile engine, a judgement signal of a knocking detecting device for optimum control. The knocking detecting device in this case operates, for example, such that a signal from a knock sensor is amplified with an appropriate gain, a knocking component is extracted by a filter, and the waveform of the knocking component is rectified with respect to its central value. Subsequently, one of the rectified signals is used for evaluating a background level conforming to a noise level, and the other signal is compared with the background level, thereby to judge the presence of the knocking. Since means for creating the device are chiefly made up of analog circuits, the device has a large number of problems in circuit area, cost, the changes of detection characteristics attributed to the aging of analog elements, the number of stages of a matching operation, etc. Meanwhile, microcomputers with high-speed A/D converters have come into wide use in recent years, and it has been requested that the knocking detection based on the analog circuit processing should be performed by microcomputer processing.

Heretofore, as to the knocking detecting device of this type, there has been a prior-art technique disclosed in Japanese Patent application Laid-open No. 193333/1984 by way of example. Here, the following is indicated: A pressure signal from an intracylindrical pressure sensor is input to an integrator through a charge amplifier, a BPF (band-pass filter) and a rectifier. Subsequently, the pressure signal having been input is integrated over a predetermined angular extent before a top dead center in the signal of a crank angle and over the predetermined angular extent after the to dead center, and the ratio of the respective integral values is computed. The computed value is compared with a reference value conforming to operating conditions, thereby to judge knocking.

In addition, as to the setting of a background level, there is known a prior-art technique from Japanese Patent application Laid-open No. 79320/1987 by way of example. In this prior-art technique, the background level is calculated in terms of the average value of the levels of the knocking signals of an intracylindrical pressure sensor, and, when the signal level is predetermined times the background value or above, the renewal of the background value is suspended.

With the former of the prior-art techniques stated above, the pressure signal is integrated analogically, so that circuit arrangement and control become complicated. Besides, in such a case where the peak of combustion pressure is in the vicinity of the top dead center, it is sometimes impossible to detect the knocking precisely. With the latter of the prior-art techniques, the knocking signal of particularly high level is not referred to in the calculation of the background level. This such a problem that the level setting lacks preciseness.

SUMMARY OF THE INVENTION

The present invention has been made in view of the drawbacks as stated above, and has for its object to provide a knocking detecting system and a knocking detecting method for an internal combustion engine in which the detection of knocking and the calculation of a background level are digitally processed by a microcomputer, thereby making it possible to simplify hardware and to enhance the precision etc. of control.

In one aspect of performance of the present invention, there is provided a system for detecting knocking of an internal combustion engine having, a knock sensor mounted on said engine for detecting a vibration caused by an irregular combustion and for generating a knock signal, a crank angle sensor for detecting a crank angle and for producing a crank angle signal, an air flow meter provided in a throttle valve for detecting a volume of air induced into said engine and for producing an air mass signal, and a throttle sensor for sensing an opening degree of said throttle valve and for generating a degree signal, the improvement of the system which comprises control means responsive to said air mass signal and said degree signal for controlling said engine in optimum operating conditions and for generating a condition signal; A/D converting means responsive to said knock and crank angle signals and said condition signal for converting a frequency signal of said vibration into a digital value by continuously sampling said digital value and for producing a digital signal; integrating means responsive to said digital signal for integrating difference between said digital value and a background level and for generating an integrated signal; and deriving means responsive to said integrated signal for deriving a knock level by comparing said integrated signal with a judging level so as to simplify said system and to avoid characteristics deterioration due to aging by a long use.

According to such a system, the signal of the knock sensor is converted into the digital value, which is arithmetically processed. Therefore, the detection of the knocking and the calculation of the background level are effected very precisely.

PREFERRED EMBODIMENTS OF THE INVENTION

Figure 1:
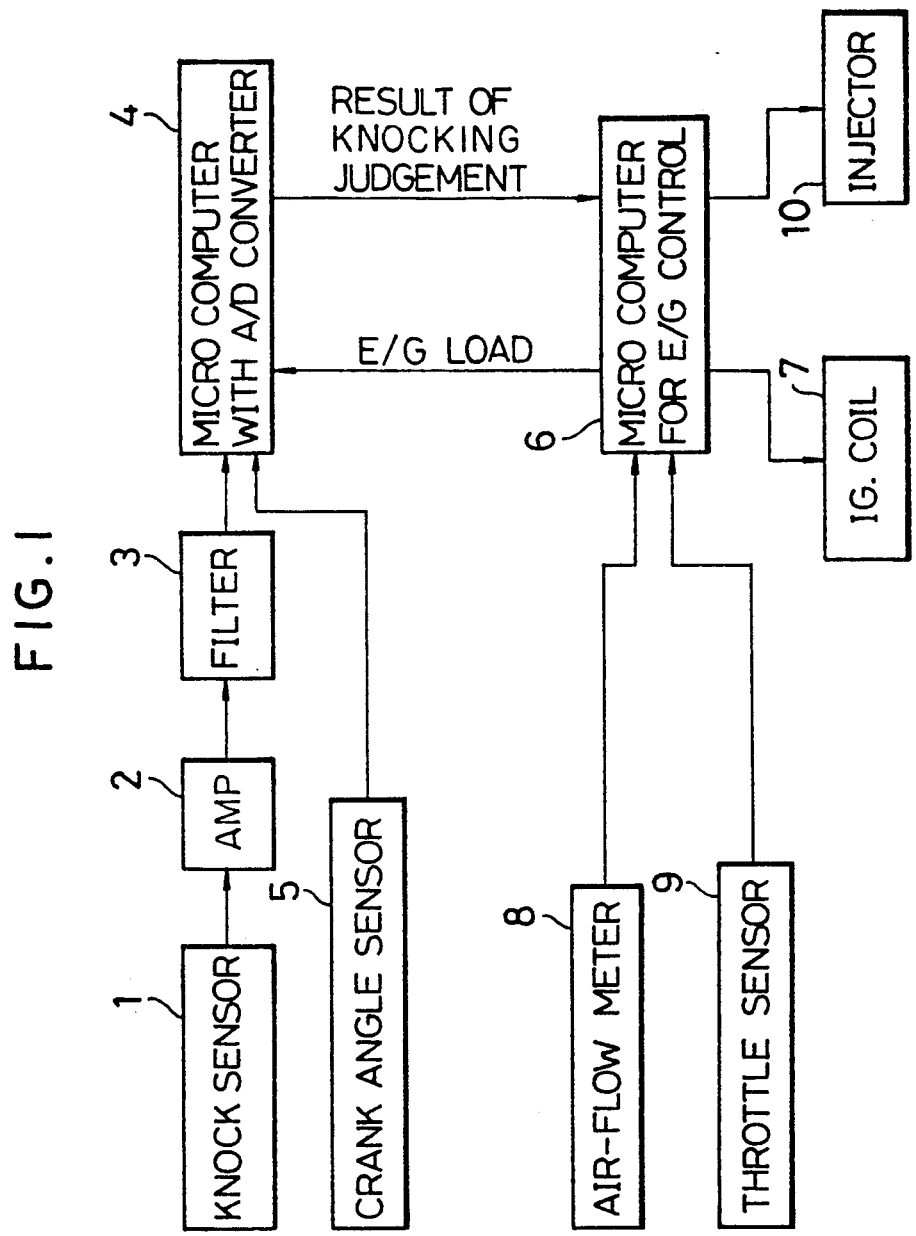
FIG. 1 is a block diagram of a control section showing an embodiment of a knocking detecting system for an engine according to the present invention.

Now, embodiments of the present invention will be described in conjunction with the drawings. The control section of a knocking detecting system will be described with reference to FIG. 1. Numeral 1 designates a knock sensor which detects the vibration of an engine proper during combustion. The vibration signal of the knock sensor 1 is amplified at a predetermined gain by an amplifier 2, whereupon a necessary frequency component is extracted from the amplified signal and is input to a microcomputer with an A/D converter, 4 by a filter 3. Also, the crank angle signal of a crank angle sensor 5 is input to the microcomputer 4 with the A/D converter. The input signals are used for setting a knocking detecting period, judging engine operating conditions, and so forth. Besides, a knocking judgement signal and a knocking level which have been detected by the micro computer 4 with the A/D converter are input to an engine controlling microcomputer 6. They are used for controlling an ignition timing, and the ignition signal of the microcomputer 6 is applied to an ignition coil 7. The engine controlling microcomputer 6 can transfer data from and to the microcomputer 4 with the A/D converter. Further, it is supplied with signals from an air flow meter 8, a throttle sensor 9, etc., while it delivers a fuel injection signal to an injector 10.

Figure 2:
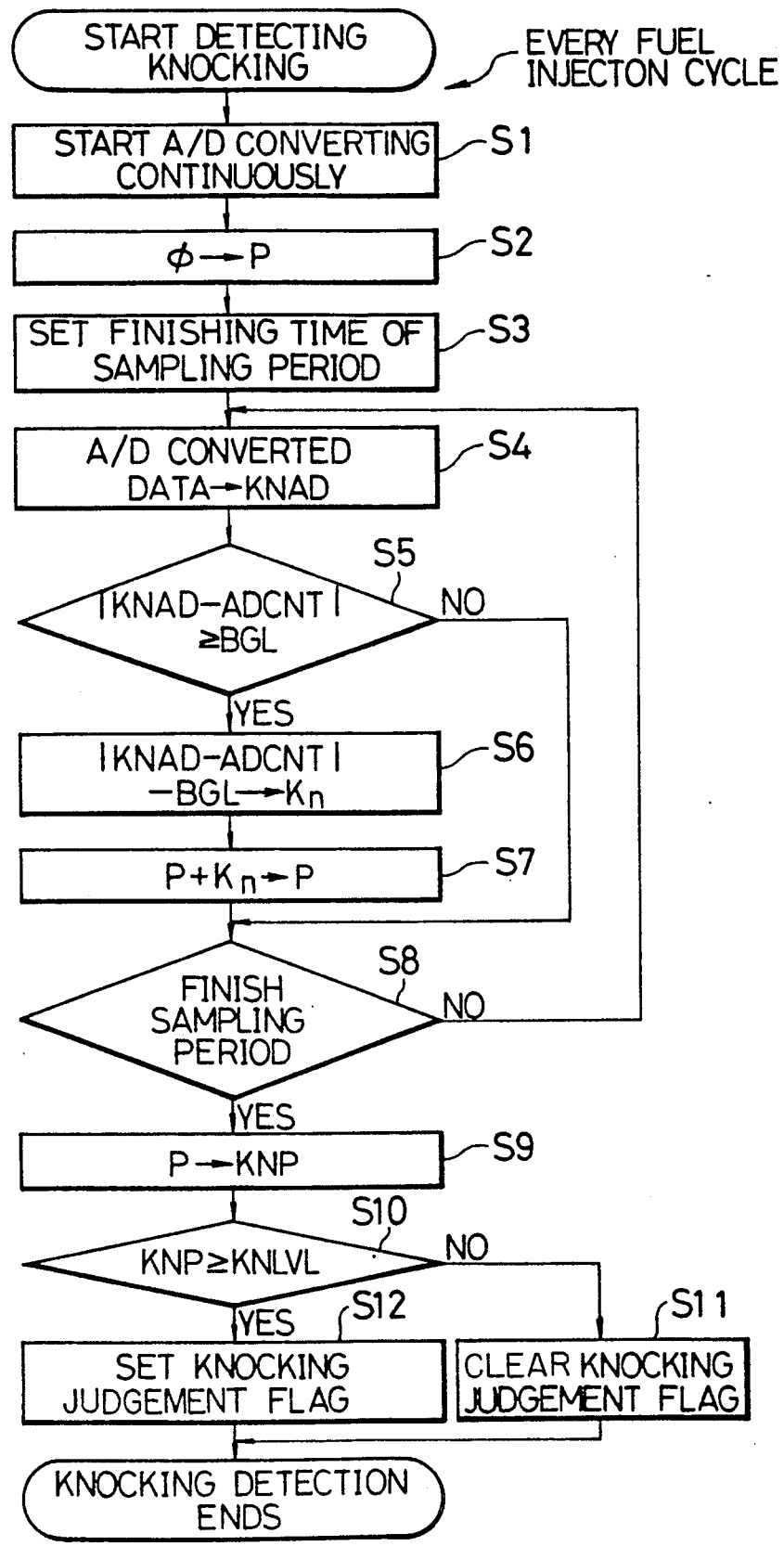
FIG. 2 is a flow chart showing the processing steps of the knocking detection means of a microcomputer with an A/D converter in an embodiment.
Figure 3:
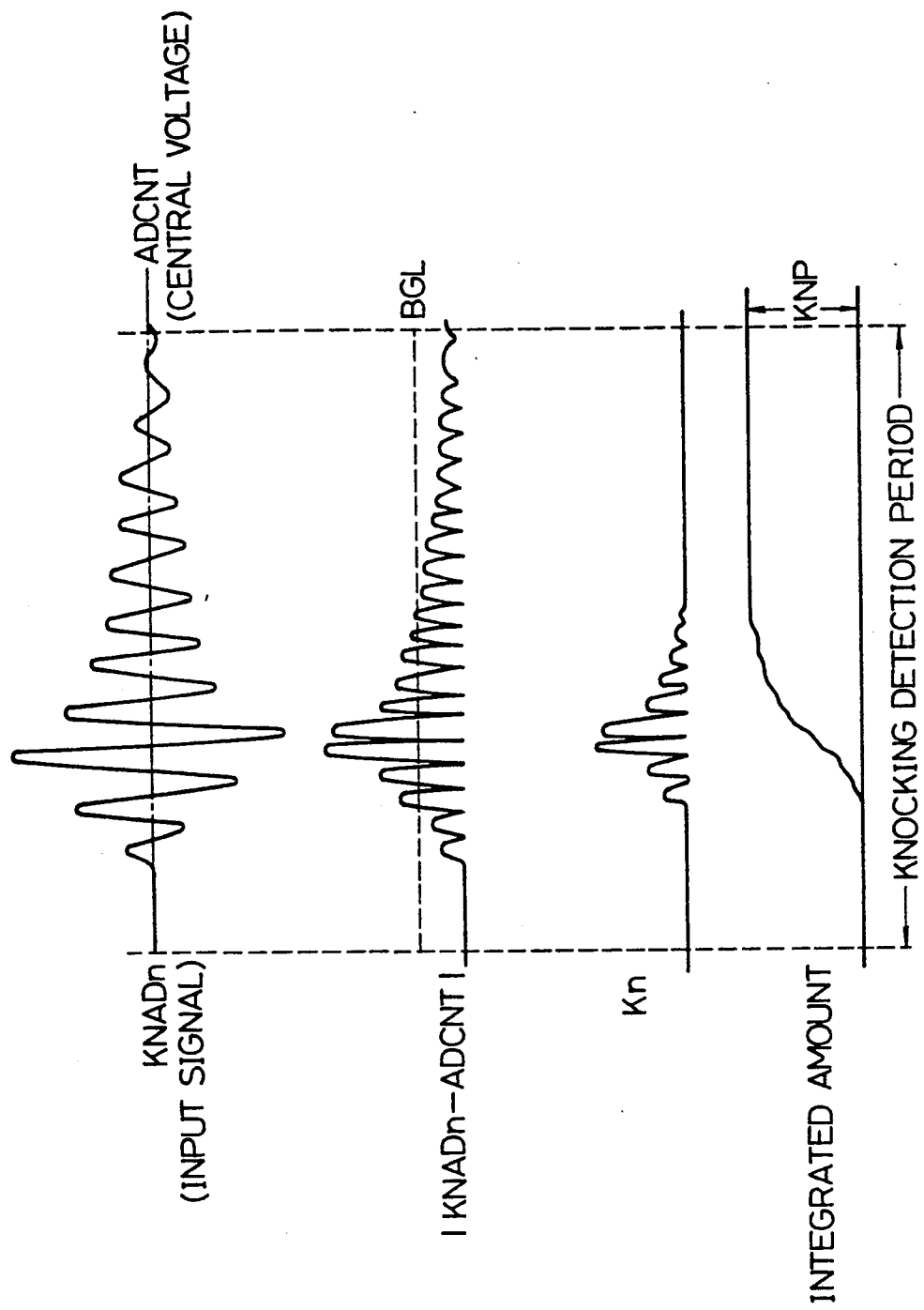
FIG. 3 is a waveform diagram of data processed by the knocking detection means in the embodiment.

Next, the control of knocking detection will be described with reference to a flow chart in FIG. 2 and signal waveforms in FIG. 3. First, a predetermined knocking detecting period $\theta$ k (for example, 10-50 degrees in terms of an ATDC angle) is set after ignition. When the period $\theta$ k has begun, the digital conversion of the knock signal by the A/D converter is started at step S1. Subsequently, data P is initialized at step S2, and the finishing time of the sampling period $\theta$ k is set at step S3. At step S4, in this way, the converted digital values KNADn (n=1, 2, ...) are continuously input at high speed (for example, one samples value in 10-20 μs) as shown in FIG. 3. At step S5, the absolute value of the difference between the digital value KNADn and the central voltage ADCNT of the input signals is compared with a background level BGL previously calculated depending upon the operating conditions of the engine, as shown in FIG. 3. In a case where the absolute value is not smaller, the value Kn of the difference between the two is calculated at step S6 as shown in FIG. 3. If the absolute value is smaller than the background level BGL, the next step is step S8. That is, the following is obtained:

$$Kn = |KNADn - ADCNT| - BGL$$

Next, the difference value Kn is added to the data P at step S7. When the sampling period $\theta$ k has finished at step S8, the control flow proceeds to step S9, at which the integral value KNP of the difference values Kn is calculated as shown in FIG. 3. That is, the following is evaluated:

$$KNO = \int KN \tag{1}$$

Thereafter, at step S10, this integral value is compared with a comparison level KNLVL for a knocking judgement as set depending upon the operating conditions of the engine beforehand. In a case where the former is smaller than the latter, the control flow proceeds to step S11, at which a knocking judgement flag is cleared. To the contrary, in a case where the former is not smaller than the latter, the control flow proceeds to a step S12, at which the knocking judgement flag is set to judge the knocking. The integral value KNP on this occasion is detected as the level of the knocking.

Owing to this embodiment, in the knocking detecting period of the combustion cycle of the engine, the frequency signal of the vibration detected by the knock sensor 1 is input to the microcomputer 4 and is continuously converted into the digital values KNADn, which are used for the processing. That is, the increment of the plus or minus digital value KNADn relative to the background level BGL is added, and such incremental values Kn are integrated. Accordingly, the integral value KNP in this case conforms to the magnitude of the knocking, and the presence of the knocking and the knocking level are appropriately detected using the integral value KNP.

Figure 4:
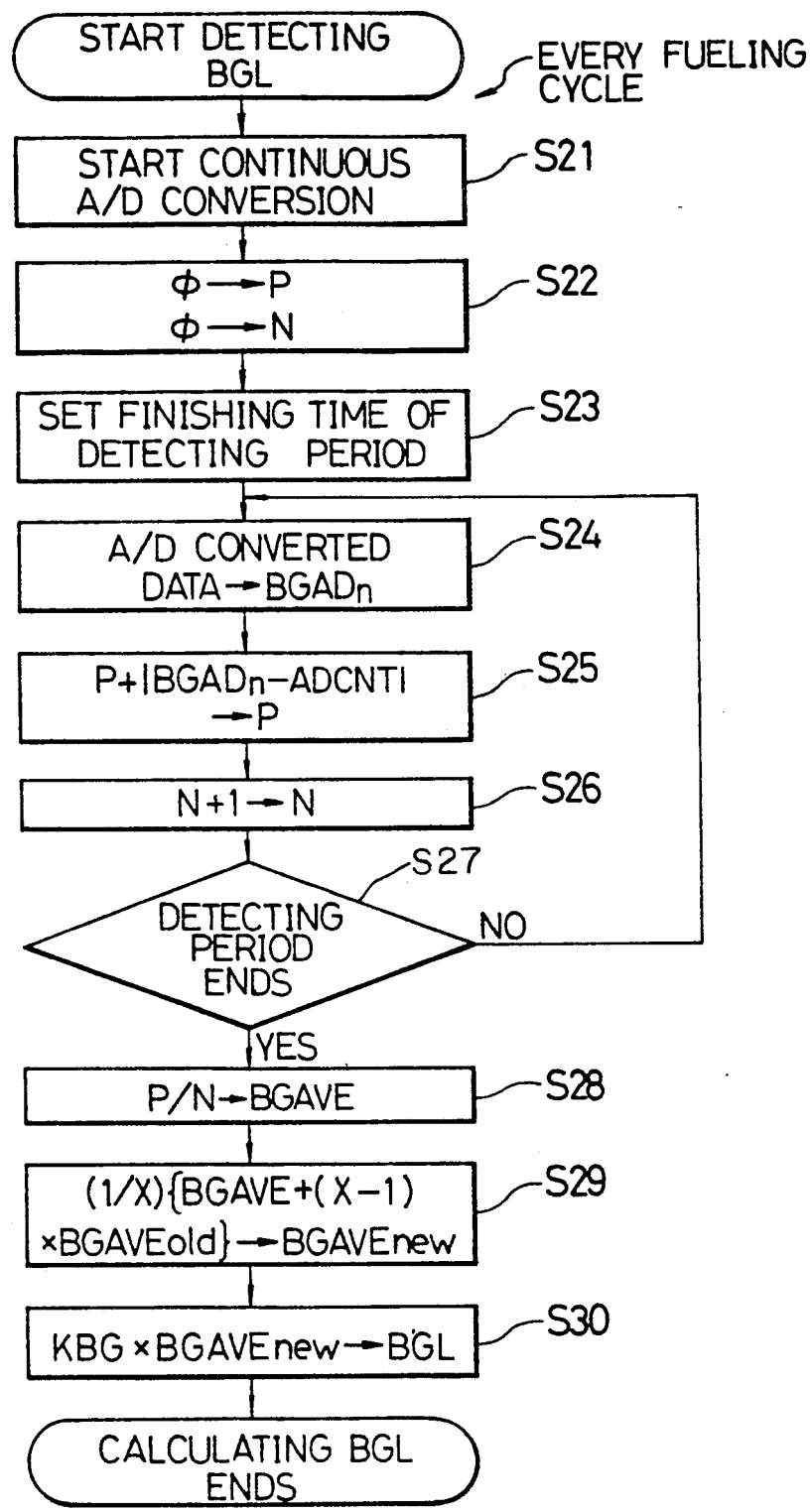
FIG. 4 is a flow chart showing the processing steps of the background level calculation means of the microcomputer with the A/D converter in an embodiment.

Now, an embodiment in which the background level is similarly calculated by an A/D conversion and processed by the microcomputer 4 will be described with reference to a flow chart in FIG. 4. First, also in this case, a background level detecting period $\theta$ B as predetermined (for example, 10-50 degrees in terms of an ATDC angle) is set within the cycle of the engine, and it sometimes overlaps the knocking detecting period $\theta$ k stated before. Herein, when the period $\theta$ B has begun, the A/D conversion of the knock signal is started at step S21, and data P and the number N of data items are initialized at step S22. Subsequently, the finishing time of the detecting period $\theta$ B is set at a step S23, and A/D-converted digital values BGADn (n=1, 2, ...) are continuously obtained at high speed at step S24. At steps S25, S26 and S27, the average amplitude value BGAVE of the digital values BGADn in one combustion cycle of the engine is calculated on the basis of the digital values BGADn, and the number N of the data items and the central voltage ADCNT of the input signals which have been obtained in the detecting Period, as follows:

$$BGAVE = (1/N) \cdot \sum_{n=1}^{N} (|BGADn - ADCNT|) \tag{2}$$

Besides, in order to absorb the fluctuation of the average amplitude value BGAVE between fueling cycles, the average amplitude value BGAVE obtained every cycle is subjected to weighted averaging at steps S28 and S29, so as to be renewed. That is, the new average amplitude value $BGAVE_{new}$ is obtained on the basis of the calculated average amplitude value BGAVE, an old average amplitude value $BGAVE_{old}$ and a weighted averaging rate X, as follows:

$$BGAVE_{new} = (1/X) \{BGAVE + (X-1)BGAVE_{old}\}$$

Thereafter, at step S30, the background level BGL is calculated using a background coefficient KBG previously set in accordance with the operating conditions of the engine, as follows:

$$BGL = KBG \cdot BGAVE_{new}$$

Owing to this embodiment, the background level is also calculated in such a way that the digital values generated by the A/D conversion of the signal of the knock sensor 1 are processed by the microcomputer 4 with the A/D converter. In addition, since the average amplitude value is subjected to the weighted averaging every cycle, the background level becomes the optimum one which fluctuates little between the cycles, and it is used as the threshold value of the knocking detection described before.

Although, in the above, the embodiments of the present invention have been described, the invention is not restricted only to them.

As set forth above, according to the present invention, the detection of knocking and the calculation of a background level based on the signal of a knock sensor are done by converting the signal into digital values and arithmetically processing the digital values by means of a microcomputer with an A/D converter. Therefore, the invention can simplify hardware as compared with an analog system, and it has a great effect especially in case of coping with a plurality of knock sensors. Moreover, characteristics deteriorate little due to aging. The number of stages of a matching operation is small. Further, the characteristics of the knocking detection and the background level calculation are set with high versatilities.

What is claimed is:

1. A system for detecting a knocking of an internal combustion engine having, a knocking sensor mounted on said engine for detecting a vibration caused by an irregular combustion and for generating a knock signal, a crank angle sensor for detecting a crank angle and for producing a crank angle signal, an air flow meter provided in a throttle valve for detecting a volume of air induced into said engine and for producing an air mass signal, and a throttle sensor for sensing an opening degree of said throttle valve and for generating a degree signal, comprising:
   control means responsive to said air mass signal and said degree signal for controlling said engine in optimum operating conditions and for generating a condition signal;
   A/D converting means responsive to said knock and crank angle signals and said condition signal for converting a frequency signal of said vibration into a digital value by continuously sampling said digital value and for producing a digital data;
   setting means for setting a sampling period after ignition;
   background level calculating means responsive to said digital data representing said knock signal for calculating a background level by averaging said digital data within said sampling period and for generating a background level;
   comparing means responsive to said digital data for comparing a central voltage value with said digital data and for producing a first difference value;
   subtracting means responsive to said first difference value and said background level for subtracting said background level from an absolute value of said first difference value and for producing a second difference value when said absolute value is larger than said background level;
   integrating means responsive to said second difference value for integrating said second difference value within said sampling period and for generating an integrated value; and
   judging means responsive to said integrated value for determining a knocking condition by comparing said integrated value with a judging level so as to simplify said system and to avoid being affected from deterioration due to aging by a long use.

2. The system for detecting a knocking of the internal combustion engine according to claim 1, wherein said background level calculating means comprises:
   comparing means responsive to said digital value for comparing a central voltage value with said digital value and for producing a difference value;
   averaging means responsive to said difference value for averaging said digital value within said sampling period and for generating an averaged value;
   weighted averaging means responsive to said averaged value for calculating weighted mean and for producing a weighted averaged value; and
   background level setting means responsive to said weighted averaged value for calculating background level by multiplying said weighted averaged value with a predetermined coefficient and for generating a background level.

3. A system for detecting a knocking of an internal combustion engine having, a knocking sensor mounted on said engine for detecting a vibration caused by an irregular combustion and for generating a knock signal, a crank angle sensor for detecting a crank angle and for producing a crank angle signal, an air flow meter provided in a throttle valve for detecting a volume of air induced into said engine and for producing an air mass signal, and a throttle sensor for generating a degree signal, the system comprising:
   control means responsive to said air mass signal and said degree signal for controlling said engine in optimum operating conditions and for generating a condition signal;
   A/D converting means responsive to said knock and crank angle signals and said condition signal for converting an amplitude signal of said vibration into a digital value by continuously sampling said digital value and for producing a digital data;
   setting means for setting a sampling period after ignition;
   averaging means responsive to said digital data for averaging said digital value and a data number within said sampling period and for generating an averaged value;
   weighted averaging means responsive to said averaged value for calculating weighted average and for producing a weighted average value;
   background level calculating means responsive to said weighted average value for calculating background level by multiplying said weighted average value with a predetermined coefficient and for generating a background level;
   comparing means responsive to said digital value for comparing a central voltage value with said digital value and for producing a first difference value;
   calculating means responsive to said first difference value and said background level for subtracting said background level from an absolute value of said first difference value and for producing a second difference value when said absolute value is larger than said central voltage value;
   integrating means responsive to said second difference value for integrating said second difference value within said sampling period and for generating an integrated value; and
   judging means responsive to said integrated value for determining a knocking condition by comparing said integrated value with a judging level so as to simplify said system and to avoid being affected from deterioration due to aging by a long use.

4. A method for detecting a knocking of an internal combustion engine in a knocking detecting system having, a knocking sensor mounted on said engine for detecting a vibration caused by an irregular combustion and for generating a knock signal, a crank angle sensor for detecting a crank angle and for producing a crank angle signal, an air flow meter provided in a throttle valve for detecting a volume of air induced into said engine and for producing an air mass signal, and a throttle sensor for sensing an opening degree of said throttle valve and for generating a degree signal, the method comprising:

controlling said engine in optimum operating conditions in accordance with said air mass and degree signals;

converting a frequency signal of said vibration into a digital value by continuously sampling said digital value:

setting a sampling period after ignition;

computing a background level by averaging said digital value and a data number within said sampling period;

deriving a first difference value by computing a central voltage value with said digital value;

calculating a second difference value by subtracting said background level from an absolute value of said first difference value when said absolute value is larger than said central voltage value;

integrating said second difference value with said sampling period to generate an integrated value; and judging knocking condition by comparing said integrated value with a judging level so as to simplify said system and to avoid being affected from deterioration due to aging by a long use.

5. The method for detecting a knocking of an internal combustion engine according to claim 4, wherein said computing step comprises:

calculating a difference between said digital value and a central voltage value to produce a difference value;

averaging said difference value with a data number within said sampling period to provide an averaged value;

computing a weighted mean of said averaged value; and setting a background level by multiplying said weighted averaged value with a predetermined coefficient.

6. A method for detecting a knocking of an internal combustion engine in a knocking detecting system having, a knocking sensor mounted on said engine for detecting a vibration caused by an irregular combustion and for generating a knock signal, a crank angle sensor for detecting a crank angle and for producing a crank angle signal, an air flow meter provided in a throttle valve for detecting a volume f air induced into said engine and for producing an air mass signal, and a throttle sensor for sensing an opening degree of said throttle valve and for generating a degree signal, the method comprising:

controlling said engine in optimum operating conditions in accordance with said air mass and degree signals;

converting an amplitude signal of said vibration into a digital value by continuously sampling said digital value;

averaging said digital value and a data number in a predetermined range;

calculating a weighted mean value of said averaged digital value of amplitude;

computing a background level by multiplying said weighted means value with predetermined coefficient;

deriving a first difference value by comparing a central voltage value with said digital value;

calculating a second difference value by subtracting said background level from an absolute value of said first difference value when said absolute value is larger than said central voltage value;

integrating said first difference value with a sampling period to obtain an integrated value; and judging a knocking condition by comparing with said integrated value with a judging level so as to simplify said system and to avoid being affected from deterioration due to aging by a long use.

* * * * *